(12) United States Patent
McKnight et al.

(10) Patent No.: US 8,489,909 B2
(45) Date of Patent: Jul. 16, 2013

(54) DISPLAYING THE OPERATING EFFICIENCY OF A PROCESSOR

(75) Inventors: Gregory J. McKnight, Chapel Hill, NC (US); Robert R. Wolford, Strongsville, OH (US)

(73) Assignee: International Business Machines Corporation, Armonk, NY (US)

( * ) Notice: Subject to any disclaimer, the term of this patent is extended or adjusted under 35 U.S.C. 154(b) by 118 days.

(21) Appl. No.: 12/889,693

(22) Filed: Sep. 24, 2010

(65) Prior Publication Data
US 2012/0079305 A1    Mar. 29, 2012

(51) Int. Cl.
G06F 1/00 (2006.01)
G11C 5/14 (2006.01)

(52) U.S. Cl.
USPC .......................................................... 713/340

(58) Field of Classification Search
USPC .......................................... 713/340; 365/226
See application file for complete search history.

(56) References Cited

U.S. PATENT DOCUMENTS

| | | | |
|---|---|---|---|
| 5,661,658 A * | 8/1997 | Putt et al. ........................ | 702/68 |
| 5,812,860 A | 9/1998 | Horden et al. | |
| 5,958,058 A * | 9/1999 | Barrus .......................... | 713/320 |
| 6,907,535 B2 | 6/2005 | Fang | |
| 7,100,058 B1 * | 8/2006 | Tomlinson et al. ........... | 713/300 |
| 7,155,617 B2 * | 12/2006 | Gary et al. .................... | 713/300 |
| 7,170,811 B1 * | 1/2007 | Allen ............................ | 365/226 |
| 7,203,847 B2 | 4/2007 | Park | |
| 7,206,949 B2 | 4/2007 | Kuranuki | |
| 7,363,176 B2 | 4/2008 | Patel et al. | |
| 7,593,832 B2 * | 9/2009 | Vorenkamp et al. .......... | 702/182 |
| 8,055,927 B2 * | 11/2011 | Morrell .......................... | 713/340 |
| 2003/0040897 A1 * | 2/2003 | Murphy et al. .................. | 703/18 |
| 2004/0189722 A1 * | 9/2004 | Acres ............................ | 345/866 |
| 2007/0061601 A1 | 3/2007 | Park | |
| 2007/0150763 A1 | 6/2007 | Yang et al. | |
| 2007/0271473 A1 * | 11/2007 | Hosomi ........................ | 713/300 |
| 2009/0024862 A1 | 1/2009 | Goodnow et al. | |
| 2009/0158073 A1 | 6/2009 | Hsieh et al. | |
| 2009/0249092 A1 | 10/2009 | Lam et al. | |
| 2010/0058086 A1 | 3/2010 | Lee | |
| 2010/0153755 A1 * | 6/2010 | Chiu ............................. | 713/300 |
| 2010/0185888 A1 * | 7/2010 | Hahn et al. .................... | 713/340 |
| 2010/0201193 A1 * | 8/2010 | Ogura ............................ | 307/31 |
| 2011/0107115 A1 * | 5/2011 | Verdun ........................ | 713/300 |

OTHER PUBLICATIONS

Yuan, "Energy-Efficient Soft Real-Time CPU Scheduling for Mobile Multimedia Systems," ACM Symposium on Operating Systems Principles, Proceedings of the nineteenth ACM symposium on Operating systems principles, Oct. 19-22, 2003, pp. 149-163; ACM, Bolton Landing, New York, USA. Year of Publication: 2003.

* cited by examiner

Primary Examiner — Thomas Lee
Assistant Examiner — Zhipeng Wang
(74) Attorney, Agent, or Firm — Brandon C. Kennedy; Thomas E. Tyson; Biggers & Ohanian, LLP

(57) ABSTRACT

Methods, apparatuses, and computer program products are provided for displaying the operating efficiency of a processor. Embodiments include determining, by an efficiency monitor, a voltage level that a voltage regulator device provides to a processor; determining, by the efficiency monitor, whether the voltage level is within a predetermined minimum voltage range; and if the voltage level is within the predetermined minimum voltage range, displaying, by the efficiency monitor, a user notification indicating an efficiency of the processor.

14 Claims, 6 Drawing Sheets

DISPLAYING THE OPERATING EFFICIENCY OF A PROCESSOR

BACKGROUND OF THE INVENTION

1. Field of the Invention

The field of the invention is data processing, or, more specifically, methods, apparatuses, and products for displaying the operating efficiency of a processor.

2. Description of Related Art

In order to reduce power consumption of a processor, an electrical device utilizing the processor may take power reduction steps such as, reducing clock speed or reducing the level of voltage provided to the processor. However, a user is often unaware of whether the processor is operating in an energy efficient mode after the power reduction steps have been performed. There is therefore an ongoing need to indicate whether a processor is operating in an energy efficient mode.

SUMMARY OF THE INVENTION

Methods, apparatuses, and computer program products are provided for displaying the operating efficiency of a processor. Embodiments include determining, by an efficiency monitor, a voltage level that a voltage regulator device provides to a processor; determining, by the efficiency monitor, whether the voltage level is within a predetermined minimum voltage range; and if the voltage level is within the predetermined minimum voltage range, displaying, by the efficiency monitor, a user notification indicating an efficiency of the processor.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
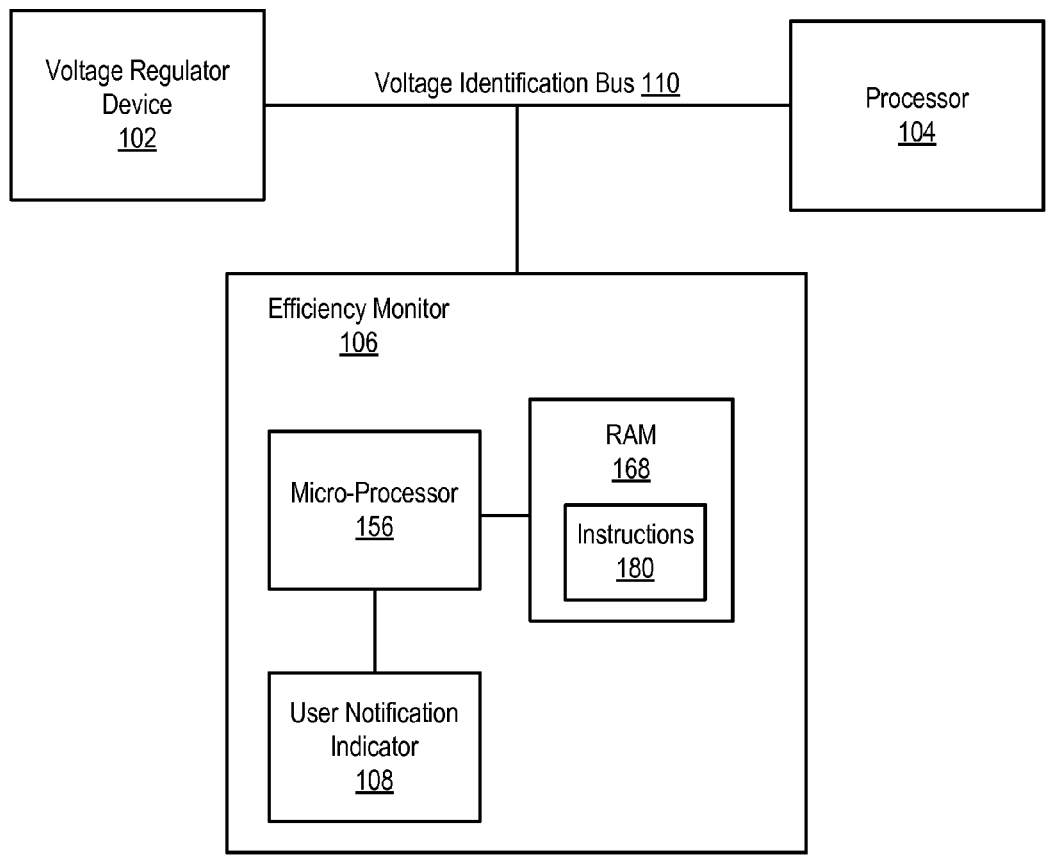
FIG. 1 sets forth a network diagram of a system for displaying the operating efficiency of a processor according to embodiments of the present invention.

Exemplary methods, apparatus, and products for displaying the operating efficiency of a processor in accordance with the present invention are described with reference to the accompanying drawings, beginning with FIG. 1. FIG. 1 sets forth a network diagram illustrating a system for displaying the operating efficiency of a processor according to embodiments of the present invention. The system of FIG. 1 includes a voltage regulator device (102) that controls a voltage level that is provided to a processor (104) through a voltage identification bus (110). The voltage regulator device (102) of FIG. 1 is an electronic device that provides the processor (104) an appropriate supply voltage. The voltage regulator device (102) can be soldered to the motherboard containing the processor (104) or be implemented as a separate installable device. The voltage regulator device (102) allows processors with different supply voltages to be mounted on the same motherboard. Some voltage regulators determine a supply voltage level to provide to a processor, but most voltage regulators sense the required supply voltage from the processor. For example, the example processor (104) of FIG. 1 may request a specific voltage level from the voltage regulator device (102). An indication of the correct supply voltage level may be communicated by the processor (104) to the voltage regulator device (104) at startup via voltage identification (VID) lines on a voltage identification bus (110). Each VID line may transmit a value that combined with values of the other VID lines of the voltage identification bus (110) indicate a voltage level for the voltage regulator device (102) to provide the processor (104).

The voltage identification bus (110) of FIG. 1 is a collection of VID lines coupling the voltage regulator device (102) to the processor (104). For example, the voltage regulator device (102) may initially provide a standard supply voltage to the processor (104). When the voltage regulator device (102) detects a required supply voltage level from the processor (104) via the VID lines of the voltage identification bus (110), the voltage regulator device (102) starts provides the required constant voltage supply at the specified level to the processor (104).

The system of FIG. 1 also includes an efficiency monitor (106) that monitors the identification of the voltage level that is transmitted over the voltage identification bus (110). The efficiency monitor (106) of FIG. 1 includes at least one computer processor (156) or 'CPU' as well as random access memory (168) (RAM). Stored in RAM (168) are computer program instructions (180) for displaying the operating efficiency of a processor in accordance with embodiments of the present invention. When executed by the processor (156) the computer program instructions (180) cause the efficiency monitor (106) to: determine a voltage level that a voltage regulator device provides to a processor; determine whether the voltage level is within a predetermined minimum voltage range; and if the voltage level is within the predetermined minimum voltage range, display a user notification indicating the efficiency of the processor. Displaying the user notification indicating the efficiency of the processor includes indicating that the processor is operating in an energy efficient mode or alternatively that the processor is not operating efficiently. In response to determining that the processor (104) is in an energy efficient mode, the efficiency monitor (106) displays the user notification by a user notification indicator (108). An energy efficient mode of the processor (104) is a predetermined range of operational voltages previously determined to be considered energy efficient. For example, when the processor (104) is being supplied the minimum voltage level for operation of the processor (104), the processor (104) may be operating in an energy efficient mode. The user notification indicator (108) of FIG. 1 may be a light source, display, or any other means to indicate the efficiency of the processor (104).

By indicating whether the voltage level provided to the processor (104) is within a predefined minimum voltage range, the efficiency monitor (108) may indicate through the user notification indicator (108) whether the processor (104) is operating efficiently. When the voltage regulator device (102) is providing the minimum operating voltage to the processor (104), the efficiency of the processor (104) may be at its greatest.

The arrangement of devices making up the exemplary system illustrated in FIG. 1 is for explanation, not for limitation. As will be appreciated to one of skill in the art, the efficiency monitor (106) may include buses, devices, and subsystems as desired, such as caches, modems, parallel or serial interfaces, SCSI interfaces, etc. Data processing systems useful according to various embodiments of the present invention may include additional servers, routers, other devices, and peer-to-peer architectures, not shown in FIG. 1, as will occur to those of skill in the art. Various embodiments of the present invention may be implemented on a variety of hardware platforms in addition to those illustrated in FIG. 1.

Figure 2:
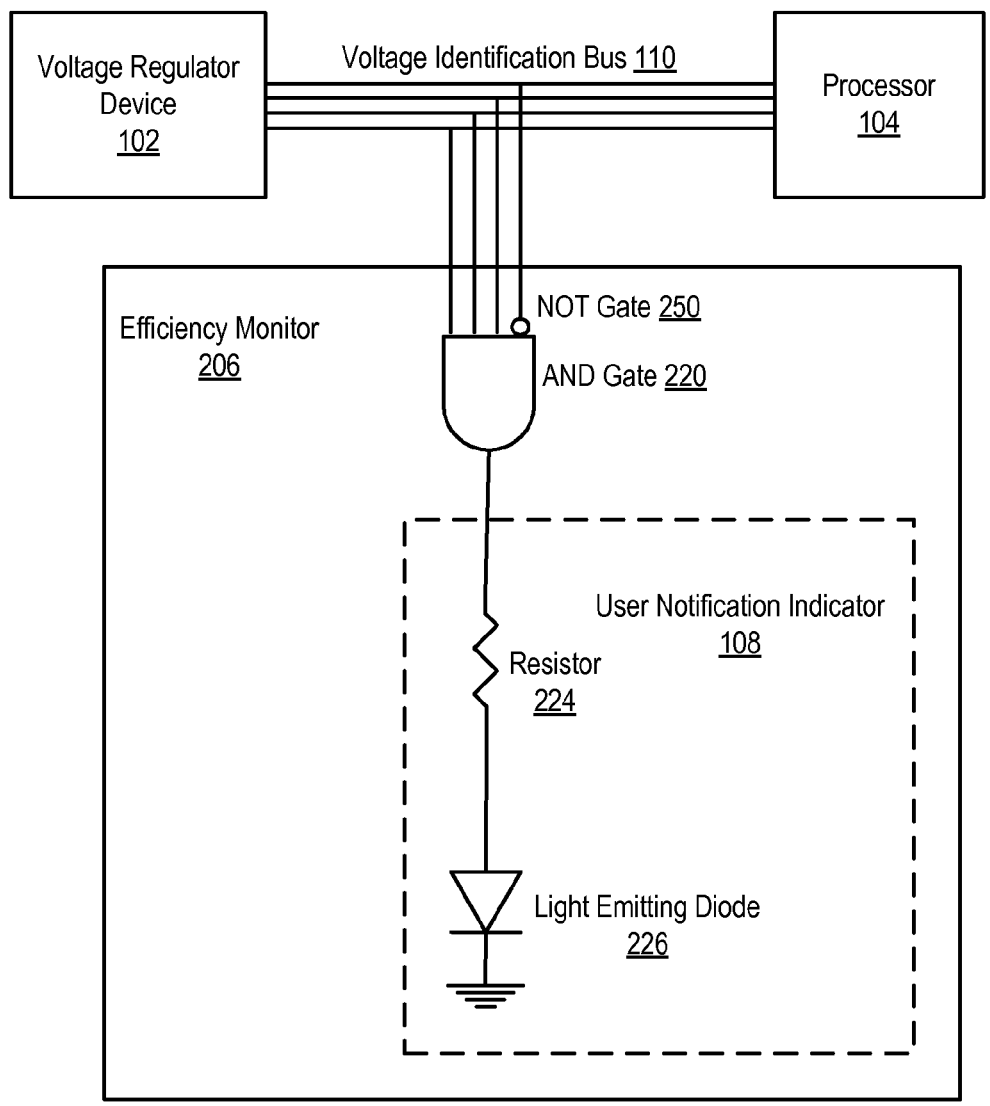
FIG. 2 sets forth a network diagram of a system for displaying the operating efficiency of a processor according to embodiments of the present invention.

For further explanation, FIG. 2 sets forth a network diagram of a system for displaying the operating efficiency of a processor according to embodiments of the present invention. The system of FIG. 2 includes an efficiency monitor (206) that includes dedicated hardware and circuitry for determining an indication of a voltage level transmitted over a voltage identification bus (110). The indication of the voltage level may be determined by detecting a value transmitted over voltage identification (VID) lines of the voltage identification bus (110). The voltage identification bus (110) of FIG. 2 includes four VID lines that correspond to four bits of the VID. Alternatively, the voltage identification bus (110) may include any number of lines to indicate any number of bits.

To determine when the VID lines of the voltage identification bus (110) have values that are equal to a predetermined minimum voltage level, the efficiency monitor (206) of FIG. 2 uses an AND gate (220) with inputs attached to each line of the voltage identification bus (110). The AND gate (220) of FIG. 2 includes a NOT gate (250) attached to one of the inputs of the AND gate (220). For example, the AND gate (220) with the NOT gate (250) indicates when the values of VID lines are equal to 0111. Values of VID lines that are equal to 0111 may indicate a minimum voltage level for operation of the processor (104).

Attached to the output of the AND gate (220) in the example of FIG. 2 is the user notification indicator (108). The user notification indicator (108) of FIG. 2 includes a resistor (224) and a light emitting diode (226). Although the example of a user notification indicator (108) of FIG. 2 includes an LED, any device that is capable of communicating a user notification may be used. In response to the output of the AND gate (220) changing, the LED (226) may illuminate. For example, when the efficiency monitor (206) identifies a particular value transmitted over the VID lines of the voltage identification bus (110), the LED (226) may illuminate indicating that the processor (104) is operating in an energy efficient mode.

A light-emitting diode (LED) is a semiconductor device that emits incoherent monochromatic light when electrically biased in the forward direction. This effect is a form of electroluminescence. The color depends on the semiconducting material used, and can be near-ultraviolet, visible or infrared. An LED consists of a chip of semiconducting material impregnated, or doped, with impurities to create a structure called a p-n junction. Charge-carriers (electrons and holes) are created by an electric current passing through the junction. When an electron meets a hole, it falls into a lower energy level, and releases energy in the form of a photon as it does so. When the voltage across the p-n junction is in the correct direction, current flows and the device is said to be forward-biased. The voltage across the LED is fixed for a given LED and is proportional to the energy of the emitted photons. If the voltage is of the wrong polarity, the device is said to be reverse biased, very little or no current flows, and no light is emitted. Some LED units contain two diodes allowing two-color operation or a range of apparent colors to be created by altering the percentage of time the voltage is in each polarity. Other LED units contain two or more diodes of different colors arranged in either a common anode or common cathode configuration. These can be driven to different colors without reversing the polarity.

Figure 3:
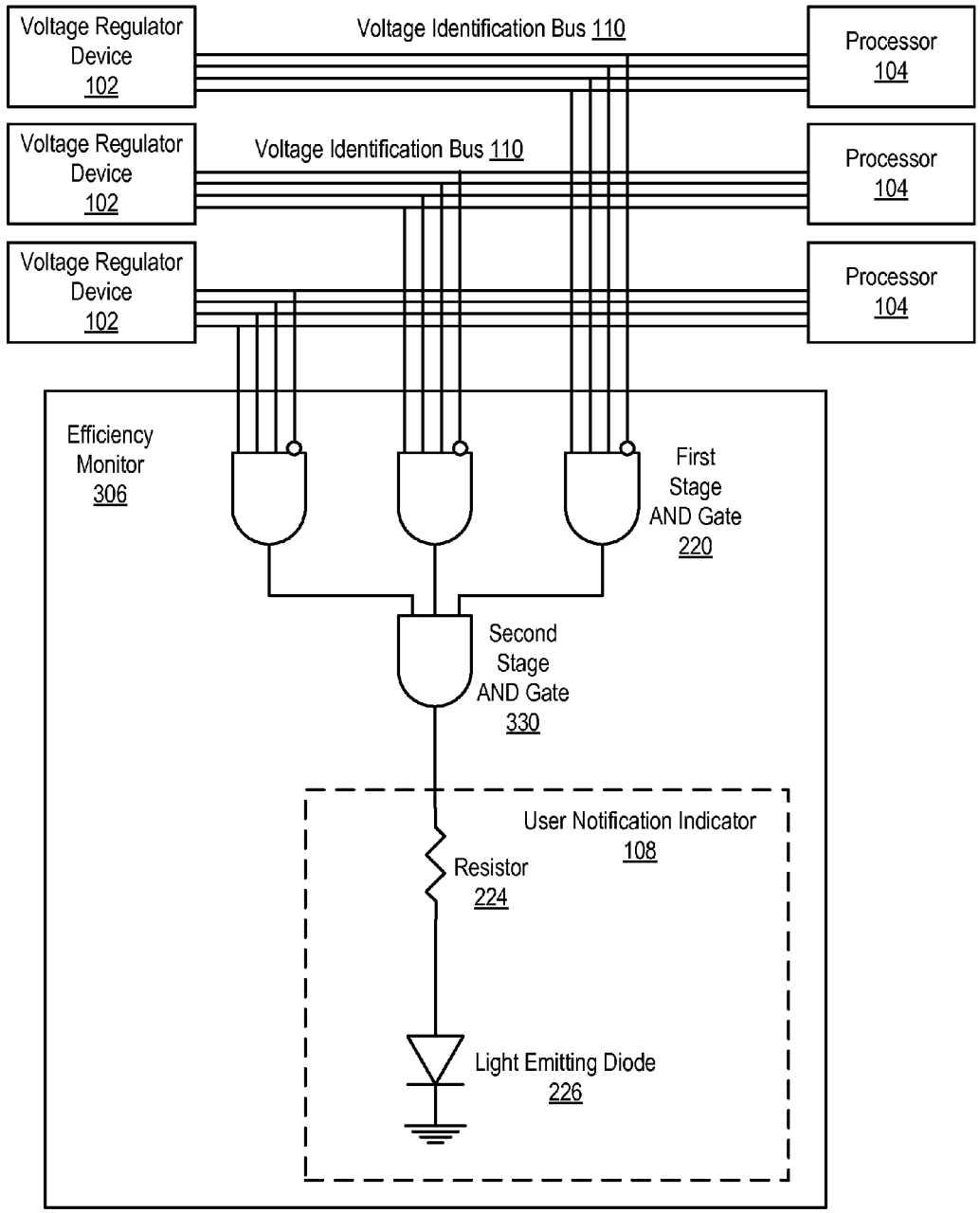
FIG. 3 sets forth a network diagram of a system for displaying the operating efficiency of a processor according to embodiments of the present invention.

For further explanation, FIG. 3 sets forth a network diagram of a system for displaying the operating efficiency of a processor according to embodiments of the present invention. The system of FIG. 3 includes an efficiency monitor (306) that determines whether multiple voltage regulator devices (102) are providing a specific voltage level to multiple processors (104). Although only three processors (104) are illustrated, those of skill in the art will appreciate that the efficiency monitor (306) of FIG. 3 may be designed to read any multiple of processors (104). The efficiency monitor (306) of FIG. 3 includes three first-stage AND gates (220). Each first-stage AND gate (220) includes inputs that are attached to the lines of one of the voltage identification buses (110). The output of each first-stage AND gate (220) will indicate if the VID lines coupled to a particular processor (104) indicate a specific voltage level, and thus whether the particular processor (104) is operating in an energy efficient mode.

The efficiency monitor (306) of FIG. 3 includes a second-stage AND gate (330) that includes inputs that are each coupled to the output of one of the first-stage AND gates (220). The output of the second-stage AND gate (330) indicates whether all of the processors (104) are receiving their respective minimum voltage levels. In FIG. 3, each first-stage AND gate is programmed to detect the same voltage level. The circuitry of the efficiency monitor (306) may be changed to detect any voltage level. For example, the AND gates may be recombined, re-coupled, or replaced with other circuitry, such as an OR gate, a NOT gate, etc. In addition, each processor (104) may have a different minimum voltage level that can be detected by the efficiency monitor (306).

Figure 4:
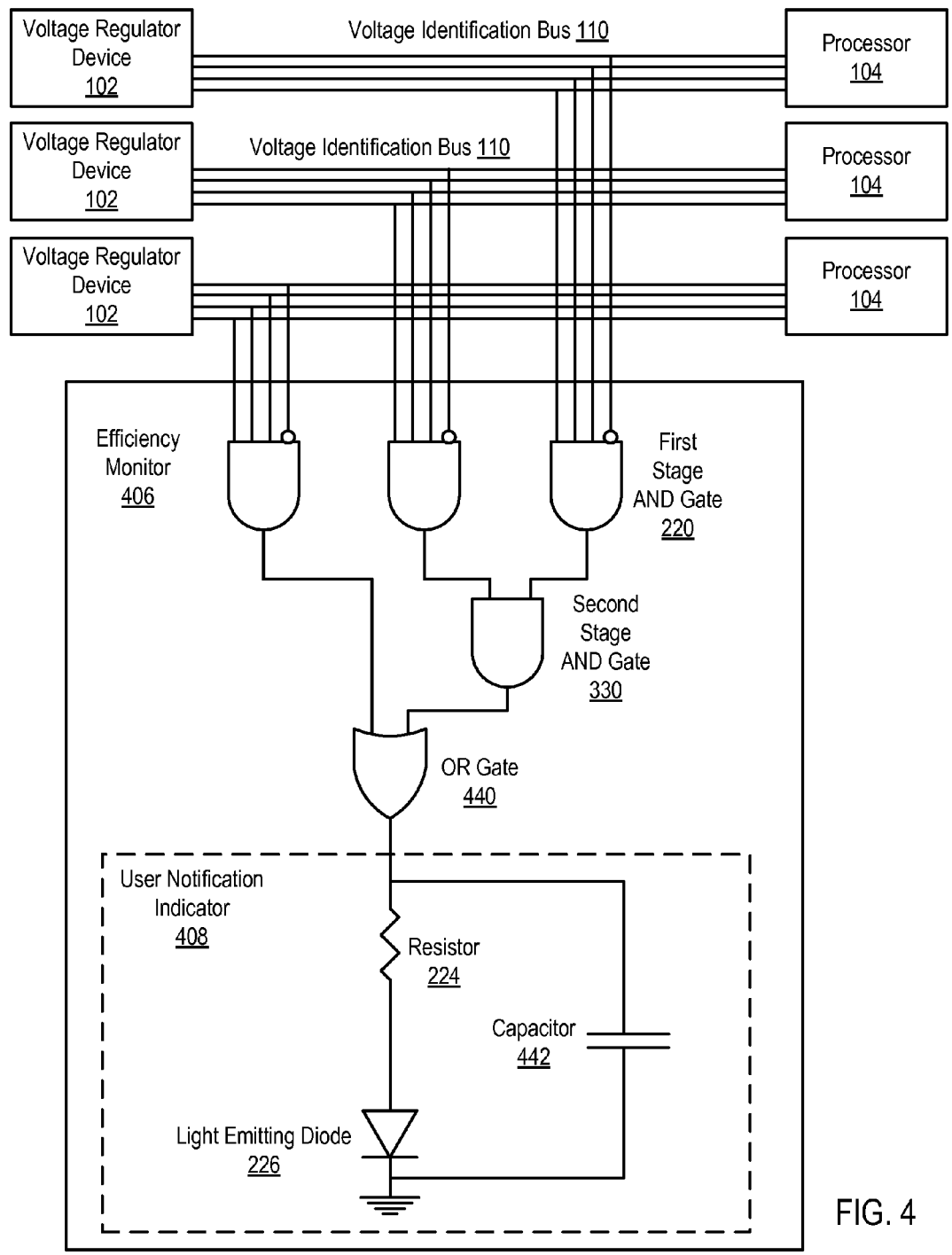
FIG. 4 sets forth a network diagram of a system for displaying the operating efficiency of a processor according to embodiments of the present invention.

For further explanation, FIG. 4 sets forth a network diagram of a system for displaying the operating efficiency of a processor according to embodiments of the present invention. The system of FIG. 4 includes an efficiency monitor (406) that determines whether one or more multiple voltage regulator devices (102) are providing a specific voltage level to multiple processors (104). The efficiency monitor (306) of FIG. 4 includes three first-stage AND gates (220). Each first-stage AND gate (220) includes inputs that are attached to the lines of one of the voltage identification buses (110). The output of each AND gate (220) will indicate if a particular processor (104) is receiving a specific voltage level.

The efficiency monitor (306) of FIG. 4 includes a second-stage AND gate (330) that includes inputs that are each coupled to the output of one of the first-stage AND gates (220). The output of the second-stage AND gate (330) indicates whether two of the processors (104) are receiving their respective minimum voltage levels. The output of one of the first-stage AND gates (220) and the output of the second-stage AND gate (330) are coupled to an input of an OR gate (440). The output of the OR gate (440) is coupled to a resistor (224) and a capacitor (442). The capacitor (442) is used to control the voltage that is applied to the resistor (224) and the LED (226). The longer that the capacitor (442) receives voltage from the output of the OR gate (440), the brighter the LED (226) will be. Therefore, the brightness of the LED (226) of FIG. 4 indicates how long one or more of the processors (104) are operating in an energy efficiency mode.

Figure 5:
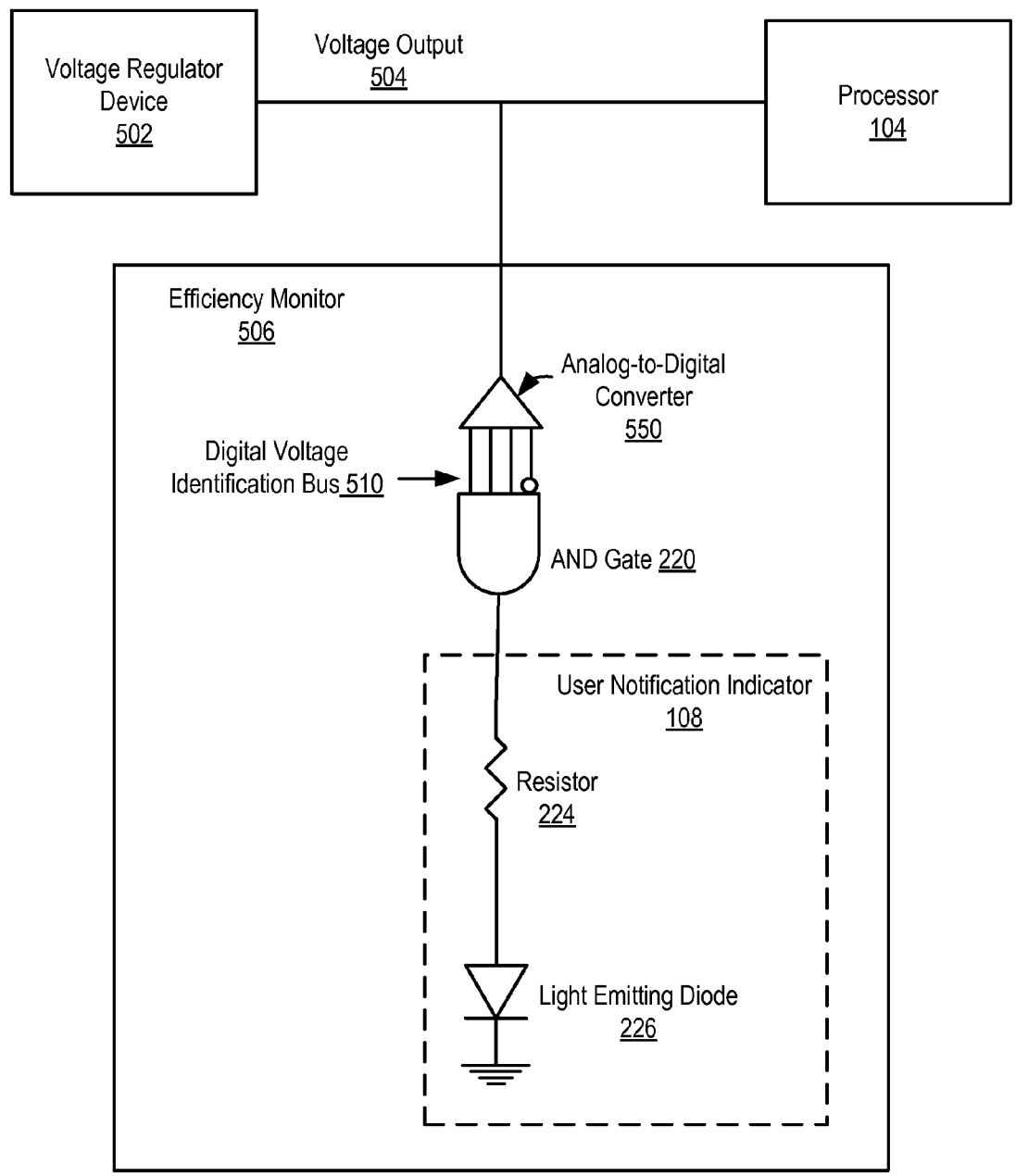
FIG. 5 sets forth a network diagram of a system for displaying the operating efficiency of a processor according to embodiments of the present invention.

For further explanation, FIG. 5 sets forth a network diagram of a system for displaying the operating efficiency of a processor according to embodiments of the present invention. The system of FIG. 5 is similar to the system of FIG. 2 in that the system of FIG. 5 includes an AND gate (220), a user notification indicator (108), a resistor (224), an LED (226), and a processor (104).

The system of FIG. 5 includes an efficiency monitor (506) that determines a voltage level of the voltage output (504) of a voltage regulator device (502) that does not indicate the voltage level to the processor (104) over a voltage identification bus. The system of FIG. 5 differs from the system of FIG. 2 in that the efficiency monitor (506) of the system of FIG. 5 includes an analog-to-digital converter (550) coupled to the voltage output (504) of the voltage regulator device (502). An analog-to-digital converter (550) is a device that converts a continuous quantity to a discrete digital number. In the example of FIG. 5, the output of the analog-to-digital converter (550) is a four bit digital voltage identification (VID) bus (510) that is connected to an AND gate (220). The digital VID bus (510) indicates a digital representation of the voltage level of the voltage output 504, such as '0001.' The output of the AND gate (220) indicates if the processor (104) is receiving a specific voltage level.

Figure 6:
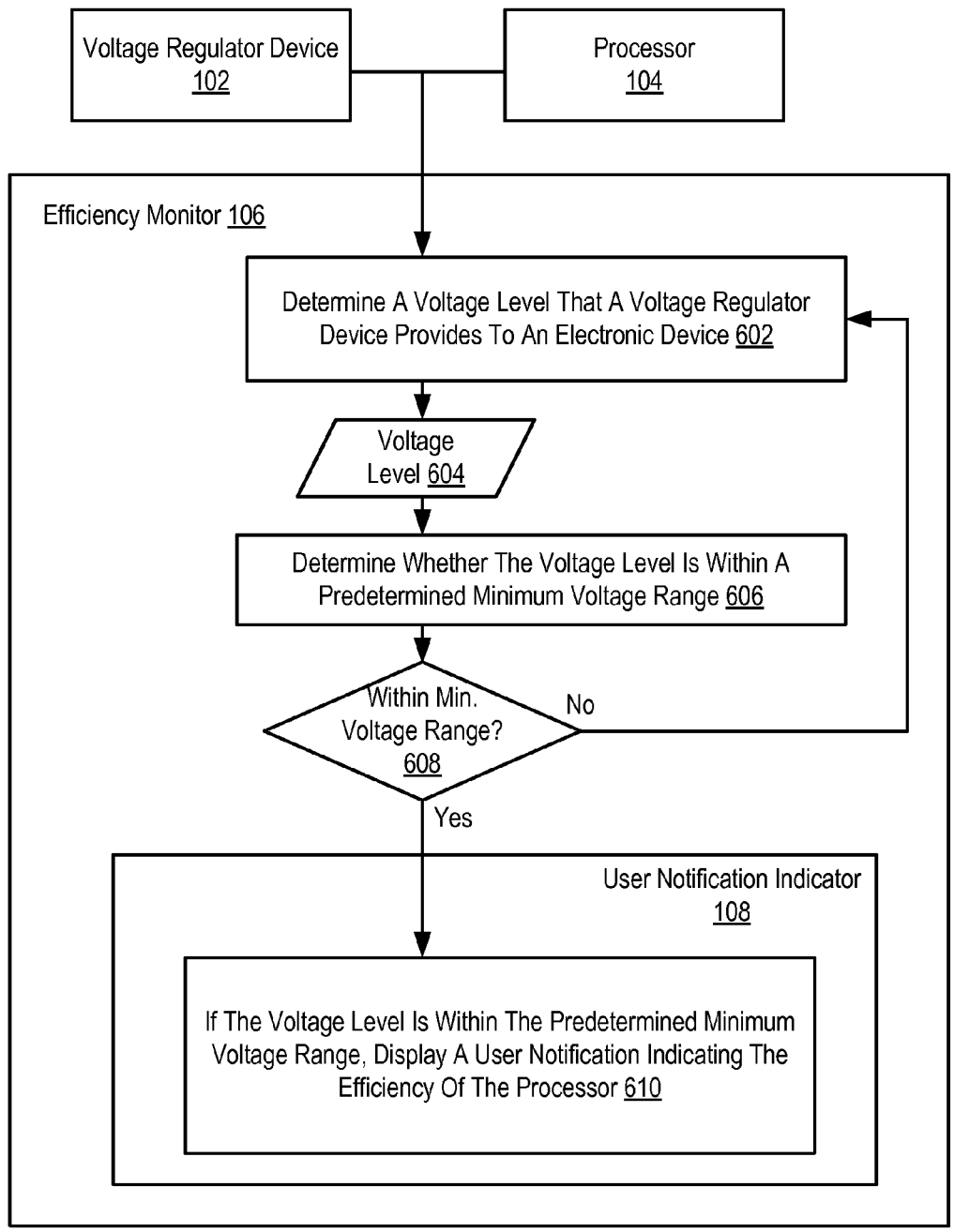
FIG. 6 sets forth a flow chart illustrating an exemplary method for displaying the operating efficiency of a processor according to embodiments of the present invention.

For further explanation, FIG. 6 sets forth a flow chart illustrating a further exemplary method for displaying, by an efficiency monitor (106), the operating efficiency of a processor according to embodiments of the present invention. The method of FIG. 6 includes determining (602) a voltage level (604) that a voltage regulator device (102) provides to a processor (104). Determining the voltage level (604) according to the method of FIG. 6 may be carried out by the efficiency monitor (106, 206, 306, and 406) of FIGS. 1-6 detecting an indication of a voltage level on voltage identification (VID) lines of the voltage identification bus (110). The efficiently monitor (106, 206, 306, and 406) of FIGS. 1-6 is a device that determines the voltage level that a voltage regulator device is to provide a processor. For example, the efficiently monitor (106) of FIG. 1 determines the voltage level indicated by bits of the voltage identification bus (110).

The method of FIG. 6 includes determining (606), by the efficiency monitor (106), whether the voltage level (604) is within a predetermined minimum voltage range (608). Determining whether the voltage level (604) is within the predetermined minimum voltage range may be carried by the efficiency monitor (106, 206, 306, and 406) of FIGS. 1-6 comparing the detected voltage level to the predetermined minimum voltage range.

The method of FIG. 6 includes if the voltage level is within the predetermined minimum voltage range, displaying (610), by the efficiency monitor (106), a user notification indicator (108) indicating that the processor (104) is operating in an energy efficient mode. Displaying the user notification indicator (108) may be carried by the user notification (108 and 408) of FIGS. 1-6 illuminating. The user notification indicator (108 and 408) of FIGS. 1-6 may be any device that is capable of indicating a user notification of the efficiency of the device. For example, the user notification indicator (108) of FIG. 1 may be an LED.

In view of the explanations set forth above, readers will recognize that the benefits of displaying the operating efficiency of a processor according to embodiments of the present invention include informing a user of the processor when the processor is operating efficiently. When the user is aware of the efficiency of the processor, the user can make changes to other devices and workload management based on that knowledge. Thus, the overall efficiency of the user and other devices may be improved by displaying the operating efficiency of the processor.

Exemplary embodiments of the present invention are described largely in the context of a fully functional computer system for displaying the operating efficiency of a processor. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of displaying the operating efficiency of a processor, the method comprising:
    determining, by an efficiency monitor, a voltage level specified by a value transmitted over a voltage identification bus that a voltage regulator device provides to a processor;
    determining, by the efficiency monitor, whether the voltage level specified by the value transmitted over the voltage identification bus is within a predetermined minimum voltage range; and
    if the voltage level specified by the value transmitted over the voltage identification bus is within the predetermined minimum voltage range, displaying, by the efficiency monitor, a user notification indicating an efficiency of the processor, wherein displaying the user notification is further based on whether at least one additional processor is being provided with a particular minimum voltage level; wherein the user notification further indicates how long the processor has been operating efficiently.

2. The method of claim 1, wherein the user notification indicates that the processor is in an energy efficient mode, wherein in the energy efficient mode, the processor is being provided the lowest possible voltage level for operation of the processor.

3. The method of claim 1, wherein monitoring the voltage regulator device includes monitoring a voltage identification bus coupled to the voltage regulator device.

4. The method of claim 1, wherein monitoring the voltage regulator device includes monitoring an analog-to-digital converter that is coupled to an output of the voltage regulator device.

5. The method of claim 1, wherein the predetermined minimum voltage level is a specific voltage level.

6. The method of claim 1, wherein displaying the user notification includes illuminating a light emitting diode (LED).

7. Apparatus for displaying the operating efficiency of a processor, the apparatus comprising a computer processor, a computer memory operatively coupled to the computer processor, the computer memory having disposed within it computer program instructions capable of:
    determining, by an efficiency monitor, a voltage level specified by a value transmitted over a voltage identification bus that a voltage regulator device provides to a processor;
    determining, by the efficiency monitor, whether the voltage level specified by the value transmitted over the voltage identification bus is within a predetermined minimum voltage range; and
    if the voltage level specified by the value transmitted over the voltage identification bus is within the predetermined minimum voltage range, displaying, by the efficiency monitor, a user notification indicating an efficiency of the processor, wherein displaying the user notification is further based on whether at least one additional processor is being provided with a particular minimum voltage level; wherein the user notification further indicates how long the processor has been operating efficiently.

8. The apparatus of claim 7, wherein the user notification indicates that the processor is in an energy efficient mode, wherein in the energy efficient mode, the processor is being provided the lowest possible voltage level for operation of the processor.

9. The apparatus of claim 7, wherein monitoring the voltage regulator device includes monitoring a voltage identification bus coupled to the voltage regulator device.

10. The apparatus of claim 7, wherein the predetermined minimum voltage level is a specific voltage level.

11. A computer program product for displaying the operating efficiency of a processor, the computer program product disposed upon a computer readable storage device, the computer program product comprising computer program instructions capable, when executed, of causing a computer to carry out the steps of:

determining, by an efficiency monitor, a voltage level specified by a value transmitted over a voltage identification bus that a voltage regulator device provides to a processor;

determining, by the efficiency monitor, whether the voltage level specified by the value transmitted over the voltage identification bus is within a predetermined minimum voltage range; and if the voltage level specified by the value transmitted over the voltage identification bus is within the predetermined minimum voltage range, displaying, by the efficiency monitor, a user notification indicating an efficiency of the processor, wherein displaying the user notification is further based on whether at least one additional processor is being provided with a particular minimum voltage level; wherein the user notification further indicates how long the processor has been operating efficiently.

12. The computer program product of claim 11, wherein the user notification indicates that the processor is in an energy efficient mode, wherein in the energy efficient mode, the processor is being provided the lowest possible voltage level for operation of the processor.

13. The computer program product of claim 11, wherein monitoring the voltage regulator device includes monitoring a voltage identification bus coupled to the voltage regulator device.

14. The computer program product of claim 11, wherein the predetermined minimum voltage level is a specific voltage level.

* * * * *